(12) United States Patent
Choi

(10) Patent No.: US 8,301,367 B2
(45) Date of Patent: Oct. 30, 2012

(54) METHOD FOR PROVIDING CONTENTS IN REAL TIME AND NAVIGATION SYSTEM FOR EXECUTING THE METHOD

(75) Inventor: Won Ik Choi, Gyeonggi-do (KR)

(73) Assignee: Thinkware Systems Corporation, Seoul (KR)

( * ) Notice: Subject to any disclaimer, the term of this patent is extended or adjusted under 35 U.S.C. 154(b) by 585 days.

(21) Appl. No.: 12/280,457

(22) PCT Filed: Jan. 25, 2007

(86) PCT No.: PCT/KR2007/000447
§ 371 (c)(1),
(2), (4) Date: Aug. 22, 2008

(87) PCT Pub. No.: WO2007/097530
PCT Pub. Date: Aug. 30, 2007

(65) Prior Publication Data
US 2009/0119004 A1 May 7, 2009

(30) Foreign Application Priority Data
Feb. 23, 2006 (KR) .......................... 10-2006-0017795

(51) Int. Cl.
*G01C 21/00* (2006.01)
(52) U.S. Cl. .................................................. 701/400
(58) Field of Classification Search ................ 701/25, 701/201, 202, 204, 207, 209, 300, 400, 540; 340/990
See application file for complete search history.

(56) References Cited

U.S. PATENT DOCUMENTS

| 6,600,982 | B1 | 7/2003 | Cragun | |
| 6,816,778 | B2 * | 11/2004 | Diaz | 701/200 |
| 6,847,885 | B2 * | 1/2005 | Sato et al. | 701/201 |
| 7,460,953 | B2 * | 12/2008 | Herbst et al. | 701/211 |
| 7,809,502 | B2 * | 10/2010 | Iizuka et al. | 701/420 |
| 2001/0008404 | A1 | 7/2001 | Naito et al. | |

(Continued)

FOREIGN PATENT DOCUMENTS

EP 1467181 A2 10/2004
(Continued)

OTHER PUBLICATIONS

International Search Report for PCT/KR2007/000447, dated Apr. 26, 2007.

(Continued)

*Primary Examiner* — Mary Cheung
*Assistant Examiner* — Michael D Lang
(74) *Attorney, Agent, or Firm* — Pearne & Gordon LLP

(57) ABSTRACT

The present invention relates to a method of providing a content in real time and a navigation system for providing a content in real time which recognizes an allowance time for providing the content by considering a time, a distance, a road straightness from a current guide point to a subsequent guide point, receives the content from a predetermined content providing server in real time, and provides the content during the allowance time. A navigation system for providing a content in real time, the navigation system including: an allowance time recognition unit recognizing an existence of an allowance time for providing the content while navigating; a server connection unit connecting to a predetermined content providing server via a communication network; a content receiving unit receiving the content from the content providing server; and a content providing unit providing the received content during the allowance time.

12 Claims, 5 Drawing Sheets

U.S. PATENT DOCUMENTS

| | | | |
|---|---|---|---|
| 2002/0103598 A1* | 8/2002 | Nakamoto | 701/207 |
| 2002/0188390 A1 | 12/2002 | Ichihara et al. | |
| 2003/0114968 A1 | 6/2003 | Sato et al. | |
| 2003/0229441 A1* | 12/2003 | Pechatnikov et al. | 701/201 |
| 2004/0186663 A1 | 9/2004 | Irie | |
| 2005/0261831 A1* | 11/2005 | Irie | 701/211 |

FOREIGN PATENT DOCUMENTS

| | | |
|---|---|---|
| KR | 1020040067320 A | 7/2004 |
| KR | 1020040087873 A | 10/2004 |
| KR | 1020050036346 A | 4/2005 |
| KR | 1020050038660 A | 4/2005 |
| KR | 1020050048271 A | 5/2005 |

OTHER PUBLICATIONS

Written Opinion for PCT/KR2007/000447, dated Apr. 26, 2007.

Extended European Search Report for 07708609 dated May 10, 2012.

* cited by examiner

METHOD FOR PROVIDING CONTENTS IN REAL TIME AND NAVIGATION SYSTEM FOR EXECUTING THE METHOD

TECHNICAL FIELD

The present invention relates to a method of providing a content in real time and a navigation system for providing a content in real time which recognizes an allowance time for providing the content by considering a time, a distance, a road straightness from a current guide point to a subsequent guide point, receives the content from a predetermined content providing server in real time, and provides the content during the allowance time.

BACKGROUND ART

Navigation systems are the systems to provide navigation information for driving of vehicles, such as cars, by using satellites. Navigation systems are referred to as automatic navigation systems. Recently, navigation systems provide navigation services, and also a variety of services such as a wireless Internet, video, and call services.

However, existing navigation systems may provide only navigation service, i.e. direction guides or other driving guides, while users drive vehicles. For example, existing navigation systems provide a user with information about whether the user should turn left or right, or go straight in an intersection. Also, existing navigation systems provide a user with information about a speed limit by using audios, texts, or images. However, there are intervals in which navigation information is not required for some period of time.

As an example, when a user drives on the expressway from Seoul to Busan, existing navigation systems are not required to provide navigation information other than information about a speed limit, a gas station location, and the like. In this case, the user may be provided with content such as traffic information, music, language study via a radio, or an audio. However, the user does not need to separately use radios or audios to acquire such information, since the navigation system may provide such content by using audios, texts, or images.

Accordingly, when navigation systems provide information, which users desire to obtain, during an allowance time while driving, the user may efficiently acquire the information without operating a separate device.

DISCLOSURE OF INVENTION

Technical Goals

The present invention provides a method of providing a content in real time and a navigation system for providing a content in real time which recognizes an allowance time for providing the content by considering a time, a distance, a road straightness from a current guide point to a subsequent guide point, provides the content in real time during the allowance time, and thereby may improve a driver's convenience.

The present invention also provides a method of providing a content in real time and a navigation system for providing a content in real time which provides a driver with the content such as traffic information, stock market information, and weather information during an allowance time in which an audio, a text, and an image, which are used for navigating, are not required to be provided while navigating.

The present invention also provides a method of providing a content in real time and a navigation system for providing a content in real time where a content category, which a driver desires, may be previously set by the driver, and a content of the content category may be provided during an allowance time, and thus a user-customized content may be provided.

The present invention also provides a method of providing a content in real time and a navigation system for providing a content in real time, which receives the content by connecting to a content providing server in real time via a mobile communication network, and provides a driver with the received content in real time.

Technical Solutions

According to an aspect of the present invention, there is provided a navigation system for providing a content in real time, the navigation system including: an allowance time recognition unit recognizing an existence of an allowance time for providing the content while navigating; a server connection unit connecting to a predetermined content providing server via a communication network; a content receiving unit receiving the content from the content providing server; and a content providing unit providing the received content during the allowance time.

According to another aspect of the present invention, there is provided a method of providing a content in real time, the method including: recognizing an existence of an allowance time for providing the content while navigating; connecting to a predetermined content providing server via a communication network; receiving the content from the content providing server; and providing the received content during the allowance time.

BEST MODE FOR CARRYING OUT THE INVENTION

Figure 1:
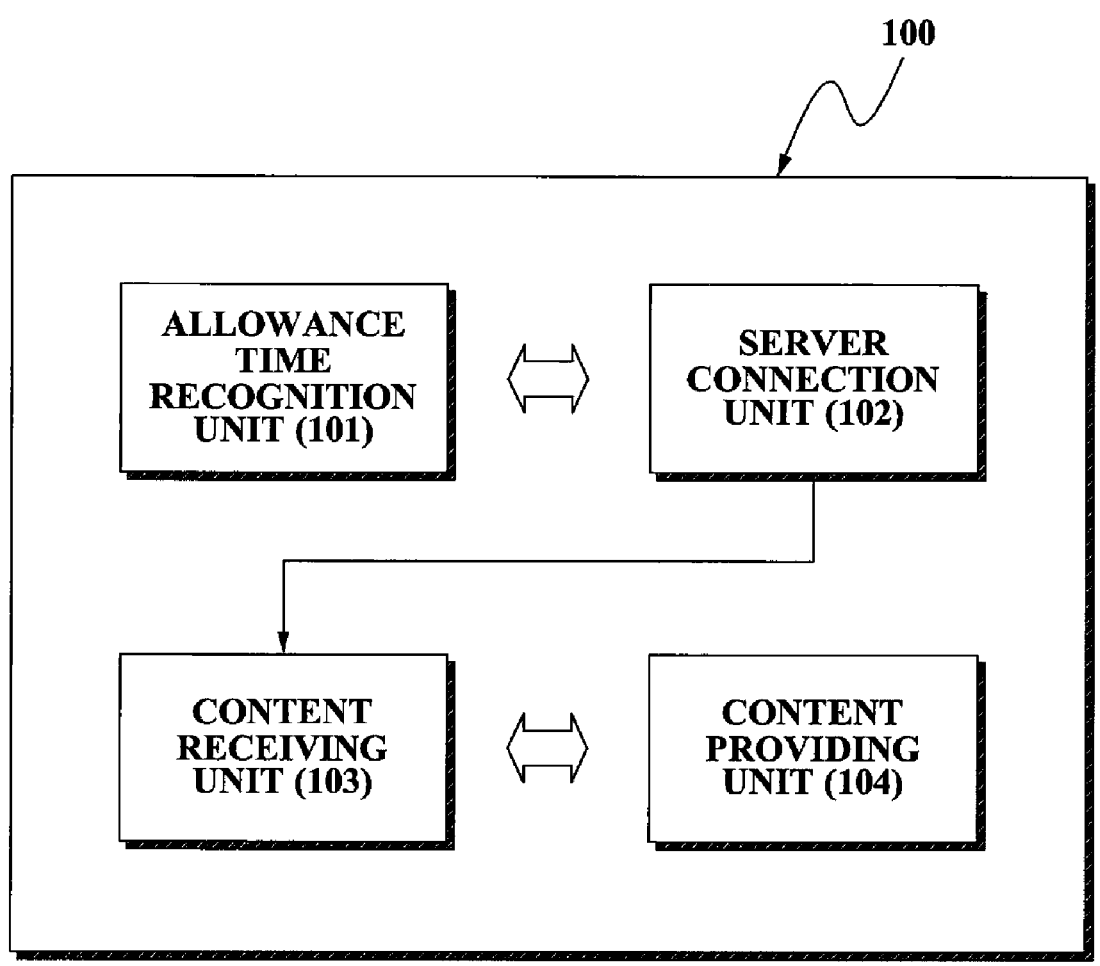
FIG. 1 is a block diagram illustrating a configuration of a navigation system for providing a content in real time according to an embodiment of the present invention.

FIG. 1 is a block diagram illustrating a configuration of a navigation system for providing a content in real time according to an embodiment of the present invention.

The navigation system for providing a content in real time 100, hereinafter, a navigation system 100, includes an allowance time recognition unit 101, a server connection unit 102, a content receiving unit 103, and a content providing unit 104. The allowance time recognition unit 101 recognizes an existence of an allowance time for providing the content while navigating. The server connection unit 102 connects to a predetermined content providing server via a communication network. The content receiving unit 103 receives the content from the content providing server. The content providing unit 104 provides the received content during the allowance time.

According to an embodiment of the present invention, the server connection unit 102 connects to the content providing server in real time in association with the existence of the allowance time. The content receiving unit 103 receives the content from the content providing server in real time. Accordingly, users may be provided with a desirable content in real time during the allowance time.

According to another embodiment of the present invention, the allowance time recognition unit 101 computes a required time from a current guide point to a subsequent guide point in association with the navigating, and recognizes the required time as the allowance time when the required time is greater than a predetermined reference time. Also, the allowance time recognition unit 101 computes the required time by considering a distance from the current guide point to the subsequent guide point.

Figure 2:
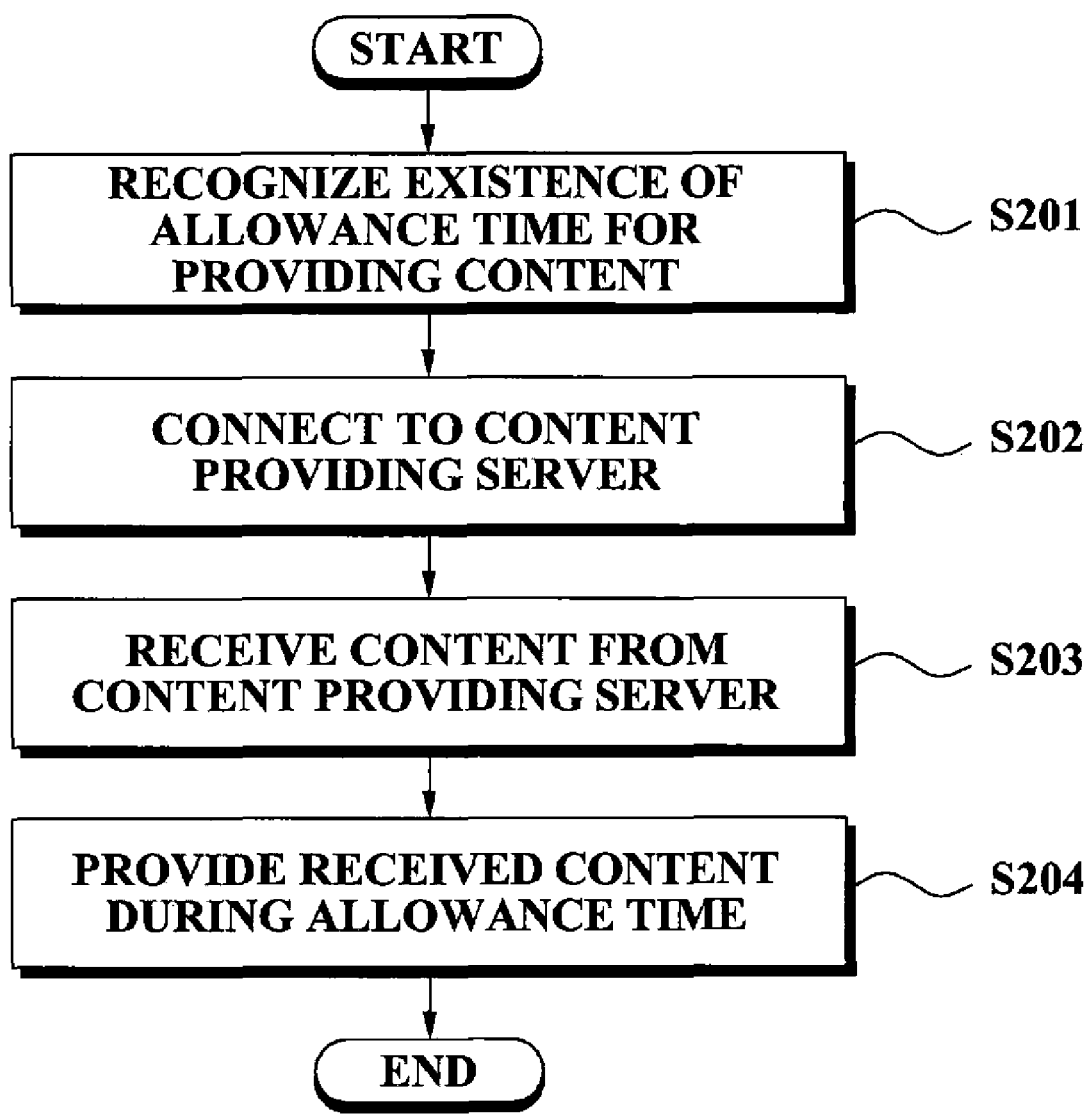
FIG. 2 is a flowchart illustrating a method of providing a content in real time according to another embodiment of the present invention.

FIG. 2 is a flowchart illustrating a method of providing a content in real time according to another embodiment of the present invention.

In operation S201, an allowance time recognition unit 101 of a navigation system 100 recognizes an existence of an allowance time for providing the content while navigating. The allowance time corresponds to a time for providing the content, and may be the same as a required time when a vehicle drives on an interval between guide points where the navigating is not required while navigating. The allowance time recognition unit 101 may consider a time, a distance, and a road straightness depending on a guide point associated with the navigating in order to recognize the existence of the allowance time.

According to an embodiment of the present invention, the allowance time recognition unit 101 computes a required time from a current guide point to a subsequent guide point in association with the navigating, and recognizes the required time as the allowance time when the required time is greater than a predetermined reference time. The reference time may be a minimum period of time which may be provided with the content, and set by the navigation system 100 itself.

As an example, the reference time may vary depending on a type of the content. For example, when the content corresponds to a music, the reference time may be set as 3 minutes. When the content corresponds to weather information, the reference time may be set as 1 minute. When the content corresponds to language information, the reference time may be set as 10 minutes. However, the reference time may be set regardless of the type of the content. Specifically, the reference time may be set as 5 minutes by calculating an average value of the reference time according to the type of the content.

The existence of the allowance time is recognized according to the set reference time. As an example, when the reference time is 5 minutes, and the required time from the current guide point to the subsequent guide point is computed as 10 minutes, the required time from the current guide point to the subsequent guide point, i.e. 10 minutes, is greater than the reference time, i.e. 5 minutes. Accordingly, the allowance time recognition unit 101 recognizes the required time as the allowance time, and transmits the existence of the allowance time to a server connection unit 102.

In this instance, the allowance time recognition unit 101 may compute the required time by considering a speed limit with respect to an interval from the current guide point to the subsequent guide point. For example, when the interval is 7 Km, and the speed limit is 70 Km/h, the required time may be computed as 6 minutes.

According to another embodiment of the present invention, the allowance time recognition unit 101 computes the required time by considering a distance from the current guide point to the subsequent guide point. For example, when the distance from the current guide point to the subsequent guide point is computed, a required time according to the distance is computed. When the required time is greater than the reference time, the allowance time recognition unit 101 recognizes the required time as the allowance time. The required time corresponds to a period of time depending on the interval where the navigating is not required. Also, the required time may be computed by considering a speed limit of the interval or a current speed of a driver.

As an example, when the interval where the navigating is not required is 9 Km, and the driver drives at 100 Km/h, the allowance time recognition unit 101 may compute the required time as 5.4 minutes. Or, when a speed limit of the 9 Km, is 90 Km/h, the allowance time recognition unit 101 may compute the required time as 6 minutes.

According to still another embodiment of the present invention, the allowance time recognition unit 101 computes the required time by considering a road straightness from the current guide point to the subsequent guide point. For example, when the road straightness from the current guide point to the subsequent guide point is straight, the allowance time recognition unit 101 determines that the navigating is not required for the interval, computes the required time, and may recognize the existence of the allowance time.

When information about only driving straight in a section of the interval from the current guide point to the subsequent guide point is expected to be provided, the allowance time recognition unit 101 determines the navigating is not required during the interval. Also, as described above, the allowance time recognition unit 101 computes the required time, and may recognize the existence of the allowance time.

As described above, the allowance time recognition unit 101, which recognizes the existence of the allowance time using above-described methods, transmits the existence of the allowance time to the server connection unit 102, when the allowance time exists.

In operation S202, the server connection unit 102 of the navigation system 100 connects to the predetermined content providing server via a communication network. The communication network may be a Code Division Multiple Access (CDMA) network, a Wireless Broadband Internet (Wibro) network, a High Speed Downlink Packet Access (HSDPA) network, and the like. The server connection unit 102 may connect to the content providing server in real time via the communication network. The content providing server is a server providing the content to the navigation system 100 and may sense a connection of the server connection unit 102.

According to an embodiment of the present invention, an owner or a user of the navigation system 100 may set a category of the content, which the owner or the user desires, by connecting to the content providing server in order to be provided with the content during the allowance time. As an example, the owner or the user may be provided with a user identification (ID) from the content providing server to set the category of the content in the content providing server. The user ID is associated with personal information or a navigation system of the user. For example, the user ID may include a name or a number of the user, or a serial number of the navigation system.

The content providing server stores the category of the content, which is set by the user, in a predetermined database in association with the user ID. Also, the content providing server stores a content ID in the database in association with the user ID. The content ID is for retrieving the content of the category in a predetermined content database. In this case, the content providing server may maintain the user ID and the content in separate databases, and may transmit the content to the navigation system 100 by referring to the database and the content database.

According to the method of providing a content in real time and a navigation system for providing a content in real time, the driver may previously set the category of the content, which the driver desires, and provide the driver the content of the category, which the driver set, during the allowance time. Thus, user-customized content may be provided.

According to another embodiment of the present invention, the server connection unit 102 may request the content providing server for a desirable content by connecting to the content providing server. In this case, the content providing server identifies the request for the content, received from the navigation system 100, without maintaining a separate user ID for providing the desirable content to the navigation system 100. Accordingly, the content providing server may transmit the content associated with the request to the navigation system 100.

According to still another embodiment of the present invention, the server connection unit 102 may randomly provide a content such as weather or traffic information, when the user does not set a separate category to be provided with the content from the content providing server.

In operation S203, a content receiving unit 103 of the navigation system 100 receives the content from the content providing server. The content receiving unit 103 may receive the content from the content providing server in real time, similar to the server connection unit 102. Also, the content receiving unit 103 may transmit the content to a content providing unit 104. The content may correspond to a multimedia content including at least one of a text, an image, an audio, and a video.

In operation S204, the content providing unit 104 of the navigation system 100 provides the received content during the allowance time. Since the navigation system 100 originally provides information with respect to the navigating by combining the text, the image, and the audio, the navigation system 100 may provide the user the multimedia content without adding a separate different function.

According to an embodiment of the present invention, the content providing unit 104 may provide the content by overlaying the content on a navigation screen. Although the navigating may be stopped while providing the content, the content providing unit 104 may provide the content on the navigation screen for user's convenience.

According to another embodiment of the present invention, the navigation screen may be stopped during the allowance time and a screen for providing the content may be provided.

Thus, the method of providing a content in real time and a navigation system for providing a content in real time according to the present invention may provide the driver with the content such as traffic information, stock market information, and weather information during the allowance time when the audio, the text, and the image, which are used for navigating, are not required to be provided while navigating.

A detailed screen providing the content in the navigation system 100 is described with reference to FIGS. 3 through 5.

Figure 3:
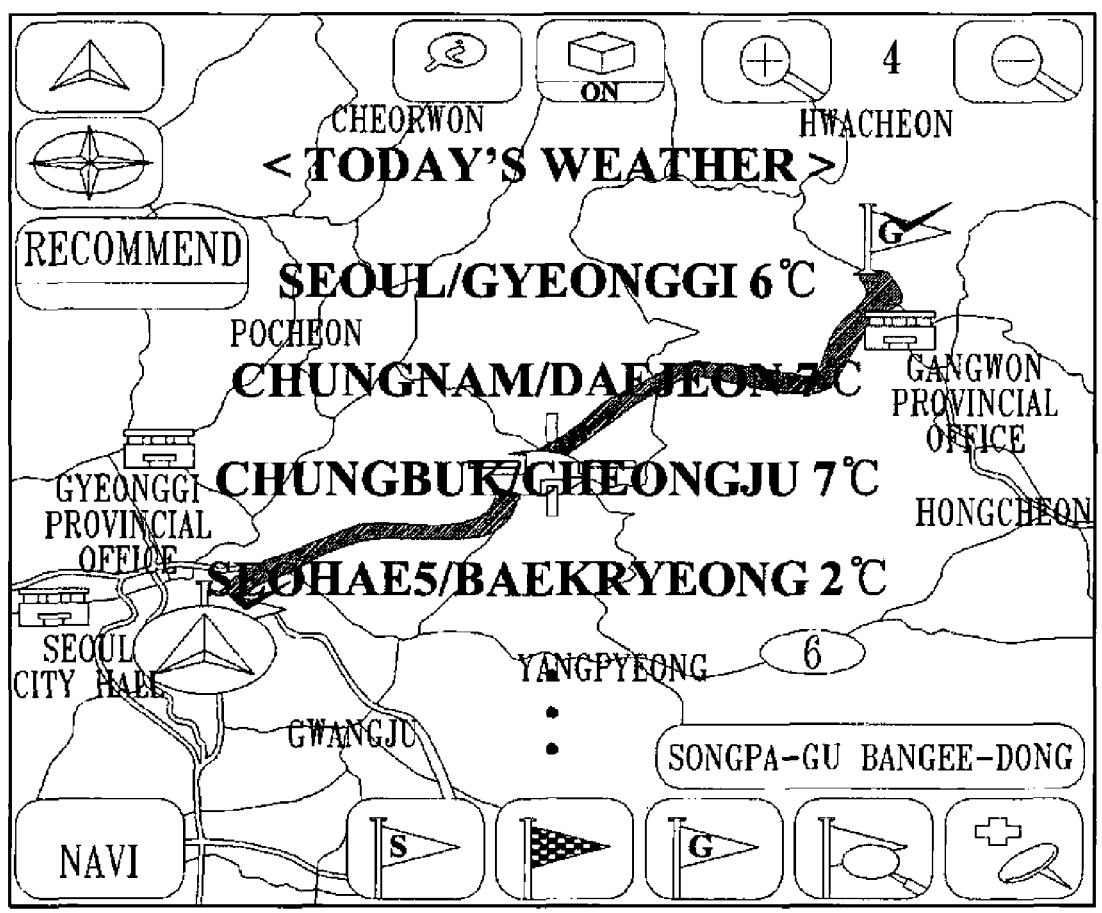
FIGS. 3 through 5 are diagrams illustrating examples of a screen displaying a content provided by a navigation system for providing a content in real time according to an embodiment of the present invention.
Figure 4:
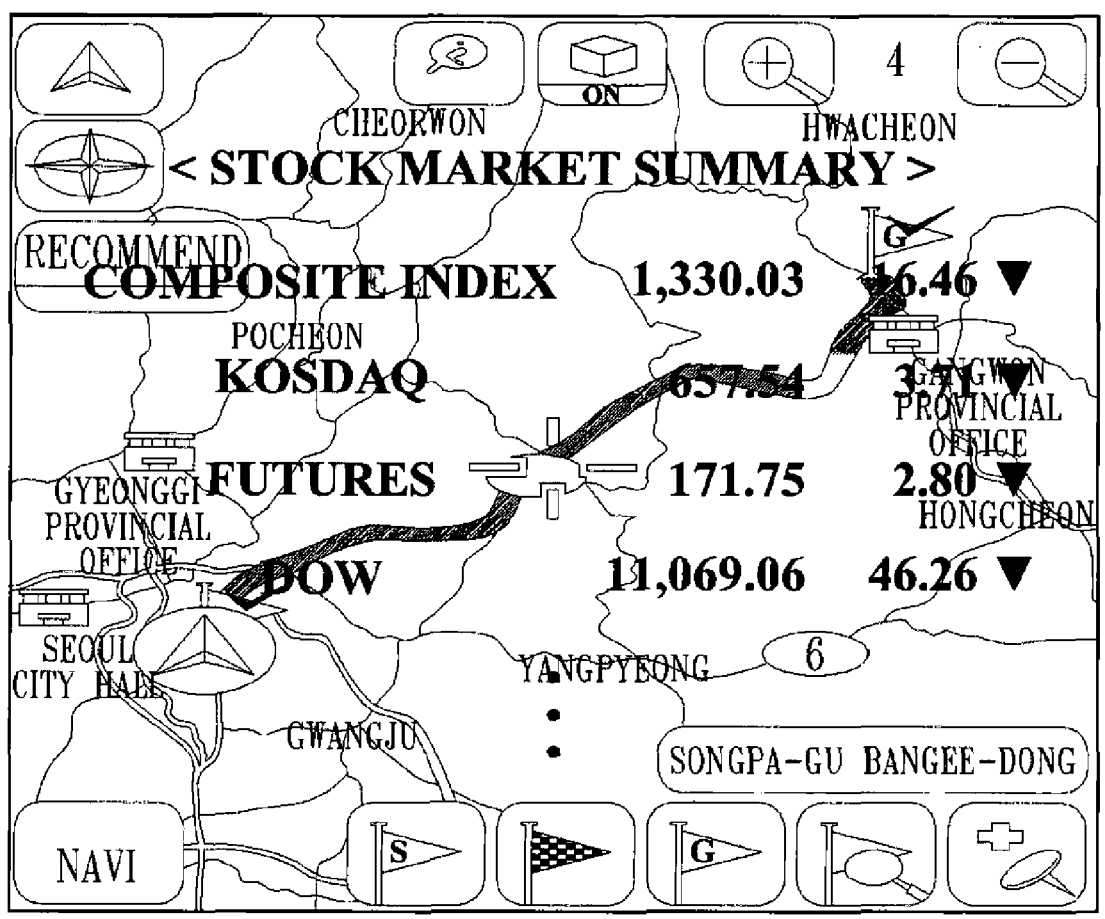
Figure 5:
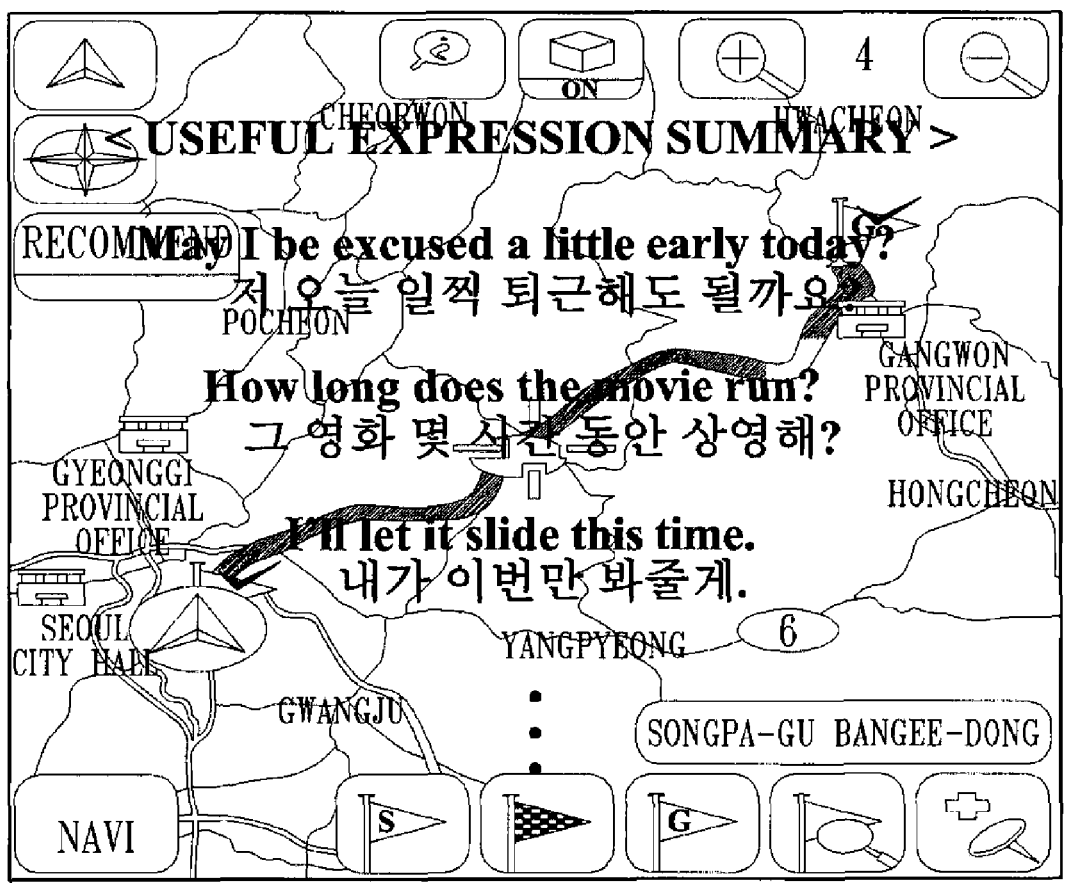

FIGS. 3 through 5 are diagrams illustrating examples of a screen displaying a content provided by a navigation system for providing a content in real time according to an embodiment of the present invention.

FIG. 3 illustrates an example of a navigation screen providing a content, associated with weather information, by overlaying the content on the navigation screen in a navigation system 100. As illustrated, the navigation system 100 may provide weather information of each province of Korea in a text form, e.g. 'Seoul/Gyeonggi 6° C.', 'Chungnam/Daejeon 7° C.', 'Chungbuk/Cheongju 7° C.', and the like. The navigation system 100 may provide an image associated with a map of Korea together with the weather information.

According to an embodiment of the present invention, when a user desires to know detailed information about a particular area on the navigation screen displaying the weather information of each area, the navigation system 100 may provide the detailed information about the particular area by receiving a double click with respect to the particular area from the user. For this, a server connection unit 102 and a content receiving unit 103 are required to request and receive the content in real time.

FIG. 4 illustrates an example of a navigation screen providing a content, associated with stock market information, by overlaying the content on the navigation screen in the navigation system 100. The stock market information may be provided, for example, 'composite index 1,330.03:16.46 ▼', 'Kosdaq 657.54:3.71 ▼', and the like. Also, when the user desires to know detailed information about a particular stock, the user clicks the particular stock, and thus a graph, stock market quotations, and a related issue, associated with the particular stock, may be provided in detail.

FIG. 5 illustrates an example of a navigation screen providing a content, associated with language information, by overlaying the content on the navigation screen in the navigation system 100. The language information may be provided in various ways including the example illustrated in FIG. 5. The navigation system 100 may display a word or an expression for language study on the navigation screen, and provide related information in audio.

Although it is not illustrated, other content may be provided by the user's simple input when the user desires the other content besides a currently provided content. For example, a menu selection such as 'other content view', and the like may be displayed on the navigation screen. When the user clicks the 'other content view', the other content may be provided.

The method of providing a content in real time according to the above-described embodiment of the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, etc. including a carrier wave transmitting signals specifying the program instructions, data structures, etc. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

Industrial Applicability

According to the present invention, a method of providing a content in real time and a navigation system for providing a content in real time recognizes an allowance time for providing the content by considering a time, a distance, a road straightness from a current guide point to a subsequent guide point, provides the content in real time during the allowance time, and thereby may improve a driver's convenience.

Also, according to the present invention, a method of providing a content in real time and a navigation system for providing a content in real time provides a driver with the content such as traffic information, stock market information, and weather information during an allowance time in which an audio, a text, and an image, which are used for navigating, are not required to be provided while navigating.

Also, according to the present invention, in a method of providing a content in real time and a navigation system for providing a content in real time, a content category, which a driver desires, may be previously set by the driver, and a content of the content category may be provided during an allowance time, and thus a user-customized content may be provided.

Also, according to the present invention, a method of providing a content in real time and a navigation system for providing a content in real time receives the content by connecting to a content providing server in real time via a mobile communication network, and provides a driver with the received content in real time.

The invention claimed is:

1. A navigation system for providing a content in real time, the navigation system comprising:
   an allowance time recognition unit computing a required time from a current guide point to a subsequent guide point by considering a distance and a road straightness from the current guide point to the subsequent guide point in association with the navigating to recognize an existence of an allowance time for providing the content while navigating when the required time is greater than a predetermined reference time, the predetermined reference time previously set depending on a predetermined category of contents to be provided; and
   a content providing unit configured to start providing a content of the category upon recognizing the existence of the allowance time and to stop providing the content upon passing the allowance time, wherein the category is set by a user and the content is received from a predetermined content providing server.

2. The navigation system of claim 1, further comprising:
   a server connection unit that connects to the content providing server in real time in association with the recognition of the existence of the allowance time, and the content is received from the content providing server in real time.

3. The navigation system of claim 1, wherein the category of the content which is set by the user is stored in the content providing server in association with a user identification (ID) of the user.

4. The navigation system of claim 1, wherein the content corresponds to a multimedia content comprising at least one of a text, an image, an audio, and a video.

5. The navigation system of claim 1, wherein the content providing unit provides the content by overlaying the content on a navigation screen in association with the navigating.

6. The system of claim 1, wherein the allowance time recognition unit computes the required time by considering the distance and the road straightness from the current guide point to the subsequent guide point in association with the navigating, and further by considering a speed limit corresponding at least one the current guide point and the subsequent guide point.

7. A method implemented by a navigation system for providing a content in real time, the method comprising:
   computing, by an allowance time recognition unit of the system, a required time from a current guide point to a subsequent guide point by considering a distance and a road straightness from the current guide point to the subsequent guide point in association with the navigating;
   recognizing, by the allowance time recognition unit, an existence of an allowance time for providing the content while navigating when the required time is greater than a predetermined reference time, the predetermined reference time previously set depending on a predetermined category of content to be provided;
   providing, by a providing unit of the system, a content of the category, the providing started upon recognizing the existence of the allowance time and stopped upon passing the allowance time, wherein the category is set by a user and the content is received from a predetermined content providing server.

8. The method of claim 7, further comprising:
   connecting, by a server connection unit of the system, to the content providing server in real time in association with the recognition of the existence of the allowance time,
   wherein the content is received from the content providing server in real time.

9. The method of claim 7, wherein the category of the content which is set by the user is stored in the content providing server in association with a user identification (ID) of the user.

10. The method of claim 7, wherein the content corresponds to a multimedia content comprising at least one of a text, an image, an audio, and a video.

11. The method of claim 7, wherein the required time is computed by considering the distance and the road straightness from the current guide point to the subsequent guide point in association with the navigating, and further by considering a speed limit corresponding at least one the current guide point and the subsequent guide point.

12. A non-transitory computer-readable recording medium storing a program for implementing a method for providing a content in real time, the method comprising:
   computing, by allowance time recognition unit of the system, a required time from a current guide point to a subsequent guide point by considering a distance and a road straightness from the current guide point to the subsequent guide point in association with the navigating;
   recognizing, by the allowance time recognition unit, an existence of an allowance time for providing the content while navigating when the required time is greater than a predetermined reference time, the predetermined reference time previously set depending on a predetermined category of content to be provided; and
   providing, by a providing unit of the system, a content of the category, the providing started upon recognizing the existence of the allowance time and stopped upon passing the allowance time, wherein the category is set by a user and the content is received from a predetermined content providing server.

* * * * *